May 16, 1933.  E. A. HALL  1,909,347
CYLINDER WORKING TOOL
Filed Sept. 4, 1931

Inventor
Ernest A. Hall
Owen & Owen
Attorneys

Patented May 16, 1933

1,909,347

UNITED STATES PATENT OFFICE

ERNEST A. HALL, OF TOLEDO, OHIO, ASSIGNOR TO THE HALL MANUFACTURING COMPANY, OF TOLEDO, OHIO, A CORPORATION OF OHIO

CYLINDER WORKING TOOL

Application filed September 4, 1931. Serial No. 561,225.

This invention relates to cylinder reamers of the type particularly adapted for cutting the ridges from cylinder walls to enable the fitting of over-sized pistons or piston rings, and an object is to produce a simple and efficient tool of this character, which may readily be adjusted in accordance with the requirements of service, is sturdy in construction, reliable in operation and is so designed as to be manufactured at a relatively low cost.

Other objects and advantages of the invention will hereinafter appear, and for purposes of illustration, but not of limitation an embodiment of the invention is shown on the accompanying drawing, in which—

Figure 1:
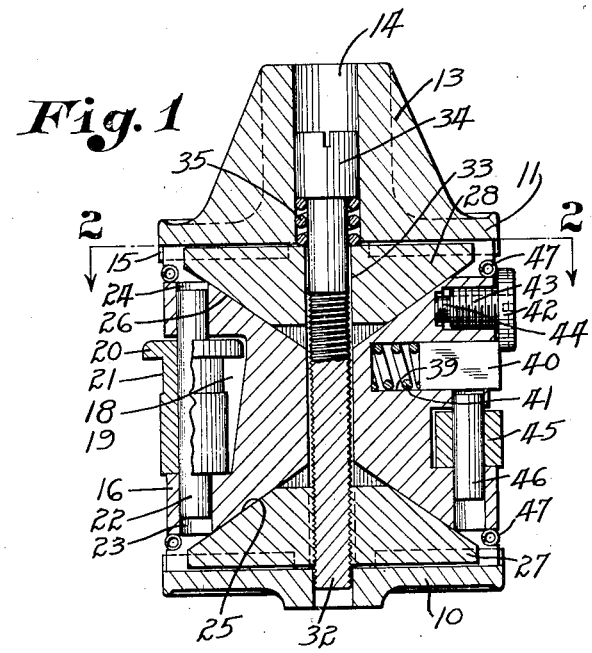
Figure 1 is a vertical sectional elevation of a cylinder reamer taken on the line 1—1 of Fig. 2.
Figure 2:
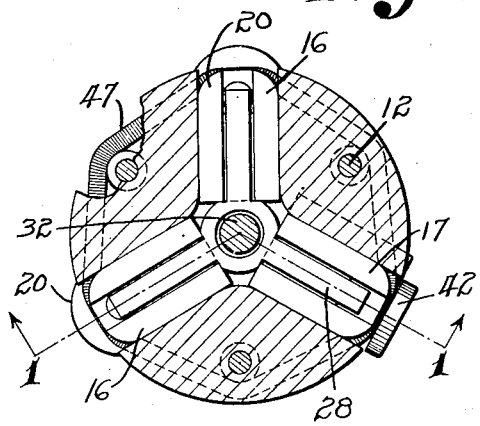
Figure 2 is a transverse sectional view on the line 2—2 of Fig. 1.
Figure 3:
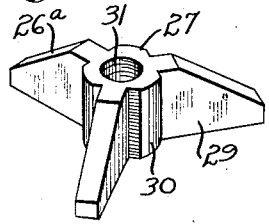
Figure 3 is a perspective view of one of the adjusting spiders for the carriers.

The illustrated embodiment of the invention comprises a cylinder reamer having a mounting consisting of end plates 10 and 11 which are held in longitudinally spaced relation by three rods 12. The end plate 11 is provided with an outwardly projecting nose 13 having a squared socket 14 to receive a suitable operating tool. In the under side of each of the plates 11 are a series of equidistantly spaced, radially arranged grooves or guides 15 in which carriers 16 and 17 are slidable, there being two carriers 16 and one carrier 17 which, as shown on Fig. 2, are arranged in equidistantly spaced relation about the mounting.

The carriers 16 are each provided with a recess 18 in which is disposed a roller 19 having a flanged end 20 and an adjacent reduced or shouldered portion 21. Each roller 19 is rotatable on a pin 22 having its ends arranged in sockets 23 and 24 disposed in opposite sides of the recess 18, the socket 23 being open to permit the pin to be inserted in position. In practice, the flange 20 of the roller 19 engages the outside of the cylinder rim and the reduced portion 21 rides over the ridge, as will be readily understood by those skilled in this art.

Formed adjacent opposite ends of each of the carriers 16 and 17 are oppositely tapered surfaces 25 and 26 respectively which are engaged by correspondingly tapered surfaces 26ª formed on spiders 27 and 28, respectively. Each spider is provided with three arms 29, which extend equidistantly from a hub 30 and the spider 27 has a screw-threaded opening 31 to receive a pin 32 which passes freely through an opening 33 formed in the spider 28.

The screw 32 has a head 34 disposed within the socket 14 and a coiled spring 35 bears at one end against the spider 28 and at the opposite end against the head 34. The spring 35 urges the spider 28 toward the spider 27, thereby retaining the tapered surfaces on the spider arms 29 and the carriers in engagement. Upon turning the screw 32, the carriers may be adjusted outwardly or inwardly with respect to the mounting in accordance with the size of the cylinder worked upon.

Figure 4:
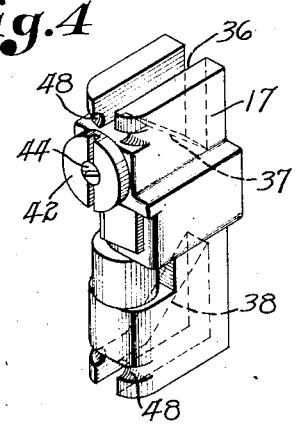
Figure 4 is a perspective view of the cutter-carrying slide or carrier.

Each of the carriers 16 and 17 is formed with a groove or guideway 36 (Fig. 4) into which extend respectively the tapered arms of the spiders 27 and 28. Similar to the carriers 16, oppositely tapered surfaces 37 and 38 are formed on the carrier 17 for cooperation with the spider arms in the manner above described. Formed in the body of the carrier 17 and opening outwardly thereof is a socket or recess 39 from which a cutter blade 40 is urged by a coiled spring 41. Outward movement of the blade 40 is limited by a head 42 of a screw 43. By adjusting the head 42 inwardly or outwardly with respect to the carrier, the position of the blade 40 may be determined, a set screw 44 being provided for securing the screw 43 in adjusted position.

Disposed beneath the cutting blade 40 is a roller 45 mounted on a pin 46 socketed in the carrier 17. The roller 45 is adapted to engage the cylinder wall beneath the ridge thereof and cooperate with portions of the rollers 19 beneath the shouldered portions 21 in retaining the tool in the desired position. The carriers are retained in their respective guides 15 by means of resilient rings 47 which engage notches 48 in each of the carriers adjacent opposite ends thereof.

From the above description it is manifest that each of the carriers is guided in its radial movement with respect to the mounting, and due to the oppositely disposed tapered surfaces on the spiders and carriers, a positive uniform adjustment of the carriers may be effected in a simple and convenient manner. The rollers 19 and 45 are so arranged that the tool operates freely substantially without friction, but is retained in the desired position relative to the cylinder walls. adjusting of the cutting blade may be readily effected by merely adjusting the screw 43 inwardly or outwardly, as desired. From a manufacturing standpoint, the above described tool is particularly advantageous since the parts can be produced at a relatively low cost. The mounting may be die-cast and the number of moving parts is kept to a minimum, so that replacement and repair cost are kept as low as possible.

Numerous changes in details of construction and arrangement may be effected without departing from the spirit of the invention, especially as defined in the appended claims.

What I claim is:

1. A cylinder reamer comprising a pair of end plates, means securing said plates rigidly in spaced relation, said plates having a plurality of opposed guideways, carriers slidable in said guideways, opposite ends of said carriers being slotted, oppositely tapered surfaces in said slots, a pair of spiders adjacent said end plates respectively, oppositely tapered surfaces on said spiders respectively engaging the tapered surfaces on said carriers, means to adjust said spiders relatively to each other, and a cutting tool on at least one of said carriers.

2. A cylinder reamer comprising a pair of end plates, means securing said plates rigidly in spaced relation, said plates having a plurality of opposed guideways, carriers slidable in said guideways, opposite ends of said carriers being slotted, oppositely tapered surfaces in said slots, a pair of spiders adjacent said end plates respectively, oppositely tapered surfaces on said spiders respectively engaging the tapered surfaces on said carriers, means to adjust said spiders relatively to each other, a cutting tool on at least one of said carriers, spring means urging said tool to cutting position, and adjustable means engaging an outer portion of said tool to regulate the position thereof.

In testimony whereof I have hereunto signed my name to this specification.

ERNEST A. HALL.